United States Patent
Miethe et al.

(10) Patent No.: US 7,793,327 B2
(45) Date of Patent: Sep. 7, 2010

(54) TERMINAL DEVICE AND METHOD FOR USING DIFFERENT SERVICES OFFERED VIA A TELECOMMUNICATIONS NETWORK

(75) Inventors: Klaus Miethe, Darmstadt (DE); Jens Johann, Griesheim (DE); Wolfgang Oberndorfer, Darmstadt (DE); Joerg Schwenk, Bad Sassendorf (DE)

(73) Assignee: Deutsche Telekom AG, Bonn (DE)

( * ) Notice: Subject to any disclaimer, the term of this patent is extended or adjusted under 35 U.S.C. 154(b) by 1562 days.

(21) Appl. No.: 10/172,147

(22) Filed: Jun. 14, 2002

(65) Prior Publication Data
US 2003/0008681 A1    Jan. 9, 2003

(30) Foreign Application Priority Data
Jun. 15, 2001    (DE)    ................................. 101 28 925

(51) Int. Cl.
*H04N 7/173*    (2006.01)
(52) U.S. Cl. .......................... 725/110; 725/31; 725/62; 725/109; 725/116
(58) Field of Classification Search ................. 725/31, 725/62, 109, 110; 382/116
See application file for complete search history.

(56) References Cited

U.S. PATENT DOCUMENTS

| | | | | |
|---|---|---|---|---|
| 5,812,930 | A | * | 9/1998 | Zavrel ........................ 725/62 |
| 5,841,971 | A | | 11/1998 | Longginou et al. ........ 395/200.3 |
| 5,940,148 | A | * | 8/1999 | Joseph et al. ........... 375/240.26 |
| 6,044,397 | A | * | 3/2000 | Eleftheriadis et al. ....... 725/139 |
| 6,046,760 | A | | 4/2000 | Jun et al. ........................ 348/7 |
| 6,201,536 | B1 | | 3/2001 | Hendricks et al. ........... 345/327 |
| 6,205,582 | B1 | | 3/2001 | Hoarty ........................ 725/93 |
| 6,243,427 | B1 | | 6/2001 | Stockton et al. ............. 375/308 |
| 6,246,695 | B1 | | 6/2001 | Seazholtz et al. ........... 347/172 |
| 6,857,131 | B1 | * | 2/2005 | Yagawa et al. .............. 725/112 |
| 6,859,937 | B1 | * | 2/2005 | Narayan et al. ............... 725/37 |
| 2001/0046372 | A1 | * | 11/2001 | Astle et al. .................... 386/83 |

(Continued)

FOREIGN PATENT DOCUMENTS

DE    694 23 714    6/1995

(Continued)

OTHER PUBLICATIONS

RFE May 1996 p. 71—German search report (translation).

(Continued)

*Primary Examiner*—Christopher Kelley
*Assistant Examiner*—Charles N Hicks
(74) *Attorney, Agent, or Firm*—Leydig, Voit & Mayer, Ltd.

(57) ABSTRACT

A terminal device for using different services offered via a telecommunications network includes at lest one receiving device for image and sound information, at least one transmitting device for data which is used to select the received image and sound information, an input unit, a decoder for the image and sound information, and outputs for audio and video signals. A server for such terminal devices includes devices for connection to a telecommunications network, devices for carrying out authorization checks using the respective data received from a terminal device, and devices for receiving and processing service requests of the terminal devices. The services used may include television programs, such as pay TV and interactive television, and Internet applications.

25 Claims, 6 Drawing Sheets

U.S. PATENT DOCUMENTS

| | | | |
|---|---|---|---|
| 2001/0047517 A1* | 11/2001 | Christopoulos et al. | 725/87 |
| 2002/0168178 A1* | 11/2002 | Rodriguez et al. | 386/92 |
| 2002/0174444 A1* | 11/2002 | Gatto et al. | 725/133 |
| 2004/0010804 A1* | 1/2004 | Hendricks et al. | 725/110 |
| 2006/0050932 A1* | 3/2006 | Tumey et al. | 382/116 |

FOREIGN PATENT DOCUMENTS

| | | |
|---|---|---|
| DE | 197 10 546 | 9/1998 |
| DE | 198 46 452 | 12/1999 |
| DE | 199 17 169 | 11/2000 |
| EP | 0 633 694 | 1/1999 |
| EP | 0 920 206 | 6/1999 |
| EP | 0 660 221 | 3/2000 |
| EP | 1 096 797 | 5/2000 |
| WO | WO 00 513 49 | 8/2000 |
| WO | WO 01 05 155 | 1/2001 |
| WO | WO 01 10 125 | 2/2001 |
| WO | WO 01 41440 | 6/2001 |

OTHER PUBLICATIONS

Hou, Peihong et al.: "Videoserver und ihr Einsatz in einer Web-Umgebung", Fernseh- und Kino-Technik, 51. Jahrgang, Nr. 1+2, pp. 38 to 42—German search report (translation).

* cited by examiner

TERMINAL DEVICE AND METHOD FOR USING DIFFERENT SERVICES OFFERED VIA A TELECOMMUNICATIONS NETWORK

BACKGROUND

The present invention relates to a terminal device and a method for using different services offered via a telecommunications network.

The present stage of development and the present development trends are marked by a large outlay for terminal devices at the user end. Thus, personal computers are mostly used as workstation systems with operating systems and diverse programs (applications) and a correspondingly large outlay in hardware. In the field of entertainment technology, television and radio are complemented with equally costly devices such as set-top box, d-box, home infotainment center and multimedia home platform.

Personal computers are highly developed computer systems on which most applications are executed locally. In the field of office communications, most personal computers are connected to a network, of which a part have access to the Internet and are able to use applications of servers, mainly using a corresponding client software.

Set-top boxes are based on computer systems having one or more processors, an operating system and, in most cases, a Java layer permitting integration of different services via an MHP-compliant API (application programming interface). Applications are provided to the user via different data channels and run locally on the set-top box. They enable a series of services to be displayed on the display of the customer, generally on the television screen.

The services/applications which are presently considered important include enhanced TV, interactive TV, Internet browsing, and email. To provide such services in a set-top box, a considerable development effort is required both in the fields of hardware and software.

Further demands are placed on devices of this kind, for example, the flexibility of the system, in particular, the implementation of new services by software download via one of the data channels, security of the offered contents against improper use or distribution, as well as a small outlay for the terminal device for low-cost introduction of the services. If flexibility cannot be guaranteed by software downloads but depends on the hardware of the devices, the problem of device obsolescence ensues.

SUMMARY OF THE INVENTION

An object of the present invention is to provide a terminal device which enables different services and, optionally, also computing applications to be used at low cost, while maintaining a maximum of flexibility.

The present invention provides a terminal device for using different services offered via a telecommunications network. The terminal device includes at least one receiving device configured for receiving image and sound information; at least one transmitting device configured for transmitting data which is used to select the received image and sound information; an input unit; a decoder configured for decoding the image and sound information; and at least one output configured for outputting at least one of audio and video signals.

In an implementation, it is possible in this context to support and use existing decoders (for example, the teletext decoder of a television set).

Using the terminal device according to the present invention, all functions which are subject to change are placed on comparatively few servers which can be reached via the telecommunications network. The audio-visual output of each application can be adapted to and represented on each terminal device. The terminal device according to the present invention can be implemented as a hardware-based design approach with reduced software support. This permits high integration and, consequently, a cost-effective production. The outlay in hardware is markedly below that for a conventional set-top box or for a PC. Only low costs are incurred for software in the area of the terminal device according to the present invention.

In this context, "services" will be understood to refer to all services to be provided via the telecommunications network, in particular, the provision of image and sound information such as television, including intercarrier sound, sound broadcasting, or still pictures as are known in diverse computer applications. In the following, the term "application" will be used in the sense of a computer application program. Thus, for example, an application can run on a server which is accessible via the telecommunications network while the use of this application is accomplished via the terminal device according to the present invention. Thus, the user can use, for example, a word processing program located on the server as if it were on the home PC. However, fast data transmission, in particular, in the direction from the server to the terminal device according to the present invention is a precondition for this. Such a data transmission, however, is made possible, in particular, by methods featuring a high data transmission rate such as VDSL.

To secure the data to be exchanged via the telecommunications network from being spied out and to protect the services and applications from unauthorized use, a further development of the present invention provides for a reading device for mobile data carriers, in particular, for entering security codes. Chip cards are preferably suitable as data carriers.

For security purposes, provision can also be made for a recognition device for security features, in particular, fingerprint or iris image.

Another embodiment serves to protect data in that the receiving device contains a decryption device and the transmitting device contains an encryption device.

In an embodiment of the terminal device according to the present invention the decoder for the image and sound information is connected downstream of the decryption device and that, moreover, program and control information which is transmitted together with the image and sound information is able to be evaluated. Through this additional information, it is possible, for example, to set the decoder to the respective use (computer or television). If suitable servers are accessible via the telecommunications network, then it is sufficient to connect a television or computer monitor and suitable loudspeakers to the outputs for audio and video signals as well as to use suitable input units in order to use the terminal device according to the present invention together with the services used via the telecommunications network.

Some uses of the terminal device according to the present invention cannot be accomplished just by decoding received image and sound information and transmitting input data. Therefore, in another embodiment, provision is made for an interface for the connection of at least one add-on device, the interface being able to receive data from the decoder and the reader and to send data to the transmitting device and to a mixer located in the path of the decoded image and sound information.

Depending on the currently performed functionality of the terminal device and, possibly, of the add-on device, the data which is generated and processed therein can be quite different. To ensure that the data is orderly routed outward, i.e., via the transmitting device into the telecommunications network and via the interface, another embodiment of the present invention provides for a filter arrangement which is controllable by the decoder and the input unit and connected to the interface, to the decoder and to the transmitting device.

The terminal device according to an embodiment of the present invention includes a circular memory for repeating video and/or audio sequences.

In an embodiment of the terminal device according to the present invention the input unit features ports for different input devices, in particular, a keyboard, a pointer device or a microphone for voice control. In the case of a use as a personal computer, in particular, a computer keyboard and a mouse are suitable here. For a typical television application, however, the input unit can alternatively or additionally be provided with an infrared or radio receiver.

A use as a so-called "television telephone" is possible in that the add-on device features one coder and inputs for each of video and audio signals.

The possibility of receiving image and sound information does not exclude the reception of television signals from terrestrial transmitters, satellites or via cable in cooperation with the terminal device according to the present invention. For this purpose, in an embodiment the add-on device includes a receiver section for television broadcasting, a decryption device and a decoder.

Even when using an add-on device, it can be advantageous to verify authorization using a chip card. In another embodiment, therefore, provision is made for the add-on device to contain a further reader for data carriers, in particular, a chip card reader.

To allow the terminal device to be adapted in each case to different codes in the transmission of image and sound information without having to hold available a multitude of algorithms in the decoder, a further development of the present invention provides the possibility of receiving, via the receiving device, data which contains algorithms for decoding the image and sound information and which is stored in the terminal device at least in volatile memory and which is able to be used in the decoder to decode the image and sound information which is received subsequently. In this context, depending on the volume of these algorithms and the transmission speed of the relevant data to the terminal device, provision can be made for a volatile storage so that, upon commencement of a service or upon powering up the terminal device according to the present invention, the algorithm-containing data is to be transmitted before the data that is to be decoded and represented audio-visually.

In the case of a larger volume of this coding algorithm data and a, compared to that, small transmission rate, it is also possible for the expert to provide non-volatile storage so that it is not required to transmit the decoding information upon each power-up or each time a service is changed.

The terminal device according to the present invention can also be used in connection with mobile radio communications for which purpose provision is made, according to an advantageous embodiment, that the terminal device is integrated in a mobile telephone, and that the video signals can be fed to the display of the mobile telephone and that the input unit is connected to the input unit of the mobile telephone. This embodiment can be used, in particular, in broadband mobile radio networks, for example, UMTS.

The terminal device according to the present invention can be integrated in a television receiver or in a video receiver. Apart from a fixed line, the connection to the telecommunications network can also be constituted by a radio link. This allows mobile use of the terminal device according to the present invention, for example, in vehicles. The device according to the present invention can also be used in kiosk systems which offer public access to different services.

To save the effort for assembling several pieces of image and sound information in a server on the network side when the intention is for a plurality of images or sound events to be reproduced with the aid of the terminal device, it is possible for the terminal device to contain an image and/or sound mixer which assembles the received sound and/or image information of several images and/or sound events.

In this connection, preferably, priorities in the assembly of the images and/or sound events be controlled using data which is received with the images and/or sound events or, furthermore, that the priorities and the representation of the images and/or sound events be dependent on operator input via the terminal device.

The present invention also provides a server for at least one terminal device, each terminal device including at least one receiving device configured for receiving image and sound information; at least one transmitting device configured for transmitting data which is used to select the received image and sound information; an input unit; a decoder configured for decoding the image and sound information; and at least one output configured for outputting at least one of audio and video signals. The server includes at least one connection device configured for connecting the server to a telecommunications network; at least one authorization device configured for performing authorization checks using data received from the at least one terminal device; and at least one receiving and processing device configured for receiving and processing service requests of the at least one terminal device.

Regarding data for images and/or sound events to be represented with the aid of the terminal device is stored in application servers, the server according to the present invention may include devices for routing service requests to at least one application server as well as devices for routing data of the at least one application server to terminal devices.

In an embodiment of the server according to the present invention the server permits remote control (power on/off, data exchange) of add-on modules on terminal devices described above.

BRIEF DESCRIPTION OF THE DRAWINGS

Exemplary embodiments of the present invention are depicted in the drawings with reference to several Figures and will be explained in greater detail in the following description.

DETAILED DESCRIPTION

In the Figures, the same parts are provided with the same reference symbols. The Figures are considerably simplified block diagrams featuring the essential functional units. Inputs and outputs as well as connecting lines are represented in the form of simple lines or circles regardless of whether they are possibly constituted by a plurality of parallel lines. A terminal device according to the present invention will hereinafter also be referred to as mini decoder.

Figure 1:
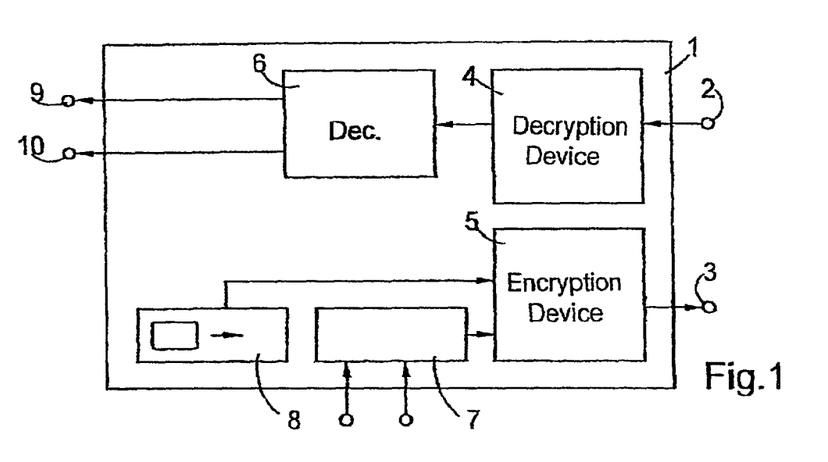
FIG. 1 shows a first embodiment of a terminal device.

Terminal device 1 according to FIG. 1 features an input 2 and an output 3 for the connection to a telecommunications network (not shown). For this purpose, it is possible to use a digital subscriber line (as, for example, ADSL or VDSL, DSL=Digital Subscriber Line) with suitable network termination units and modems. The data stream arriving at 2 is decrypted at 4, while an encryption device 5 is provided for encrypting the data stream which is transmitted to the network via output 3. Connected to the output of decryption device 4 is a decoder 6 which is used for decoding the image and sound information and at whose outputs 9 and 10 there are present video and audio signals which can then be made audible or visible via corresponding playback devices, i.e., loudspeakers and monitors.

If encryption of the information to be transmitted is dispensed with, then the functionalities of the decoder are reduced to receiving the unencrypted messages and those of the encoder to transmitting the unencrypted messages. A use of unencrypted data transmission is not mandatory for the implementation of a mini decoder and of a service used by it. Then, the operator of the network and of the server has to take other precautions for services and contents whose data are to be protected from improper use by third parties due to legal provisions or at the request of the user or at the request of the content provider.

An input unit 7 and a chip card reader 8 are connected to inputs of encryption device 5. Input unit 7, which is not further explained in the exemplary embodiment according to FIG. 1, can preferably be designed as an interface for different input devices to be connected, such as keyboard, mouse, remote control, microphone for voice control, and the like.

In order to use the mini decoder, the connection to the server via the telecommunications network is activated by inserting the chip card in chip card reader 8. The server log-on is encrypted in the mini decoder and transmitted to the server. Thereupon, the server checks the authenticity of the chip card as well as the communication paths. As an alternative or in addition to the chip card read, it is possible to integrate other ways of identifying the user, for example, fingerprint readers or iris scanners.

If the check is positive, the server answers the request and transmits the first data, which corresponds to an image on a display connected to the mini decoder. In this connection, an additional user identification such as a password (PIN) can be asked for, thereby preventing the use of a card which has been lost or stolen.

Further data is transmitted to the mini decoder, possibly after checking the additional identification, the data representing a selection menu for the available services. The design of this image content and of the content (basic choice) can be adapted to the image user individually and in an up-to-date manner. In this context, the possible spectrum of the basic choice depends also on the bandwidth of the communications paths to and from the server. Thus, for example, it makes no sense to offer a television program to a mini decoder which is connected to the telecommunications network and, thereby, to the server via a narrow-band line. In the case of broadband lines, however, this is absolutely possible.

When the user selects a service or an application from the choice, this message is transmitted encrypted to the server. The server then starts a corresponding application. Such an application can be installed on the server or on a further server which will hereinafter be referred to as application server when it is required for distinction from the mini-decoder controlling mini-decoder server. Since the distribution of tasks among the servers depends on the relevant technical, legal and economical conditions, reference will only be made to one server in the explanation of the exemplary embodiments.

The user has always the possibility of terminating a specific application or a specific service with a simple command, for example, by pressing a key. The program of the server of the currently running application shuts down immediately and the basic choice is offered to the user for selection. Or the program responds with messages, for example, that data will be lost upon termination and/or with the question of whether to temporarily store the current state. A second depression of a termination key by the user will then in any case cause the server to terminate the application, whereupon the user gets the basic choice again.

The possibility of terminating the connection to the server is also provided in the representation of the basic choice so that the user can terminate the connection by an input. Besides, removal of the chip card results in a termination of the connection.

Preferably, provision can be made in the present invention that the connection to the mini decoder and its functioning are continuously checked through test signals and that if no response comes, that is, in the case of a failure of the mini decoder or of the connection, the server or the application server terminates the program, storing the present state.

If services or applications are not directly provided by the server or the operator thereof but are furnished via an application server, the coded stream of image and sound information of the content of the providers can be passed through to the terminal device without intervention in the content and made visible or audible there. This procedure permits a clear distinction between the contents for which the program provider is responsible and the transmission to the terminal device for which the server and network operator is responsible. In this context, the encryption can already be carried out at the program provider end or at the server and network operator end.

A provider who charges the customers fees for his/her contents, can be guaranteed a high degree of security with the method according to the present invention. In addition, he/she is able to monitor the utilization of his/her contents, it being required for the server and network operator and for the provider to choose a billing method which meets the relevant legal requirements on data security. The production and distribution of pirated copies by recording the data at the video output can be made more difficult by the provider using so-called "invisible watermarks" in the video signal which make it possible to trace back the source of the recording.

In comparison with the embodiment according to FIG. 1, the embodiment according to FIG. 2 has an interface 12 which is used for controlling the communication and for communicating with other devices, hereinafter called add-on devices or add-on modules. The add-on devices can be connected to the mini decoder via a suitable port 13. In this manner, the functionality of the mini decoder can be considerably extended. Via interface 12, it is possible, inter alia, to receive video and audio signals which, with the aid of a mixer 11, are fed via outputs 9 and 10 to the image and sound playback devices connected thereto.

In this context, the chip card which is inserted in chip card reader 8 can also be used for validating the use of an add-on module. Information for controlling the application as well as data for the application on the server are fed by the add-on device via interface 12 to encryption device 5 and routed encrypted via output 3 and the telecommunications network to the server. Control information and server data which are intended for the add-on module are fed to the add-on module via interface 12 after the decryption at 4 and the decoding at 6.

A filter 13 for the user input data allows commands to be directly transmitted to the add-on device. In this context, the filter function is set via the server. Data of the add-on device for display on the display are routed via mixer 11. In the mixer, video and sound signals can be superimposed, the position, size of the windows, and the order (foreground/background) for images being able to be controlled by the server. In this context, the use of transparency in both video sources permits complex distributions of the display area among the two sources to be mixed. Connected add-on devices log on to the server at the start of the connection.

The functionalities of the filter and of the mixer can also be used in an implementation of the mini decoder without interface 12, for example, to represent the position of a mouse pointer. In this case, the data of the end position is defined by clicking and it is only then that data about the performed mouse movement is transmitted to the application server. In this context, the application can inform the mini decoder whether only the current position of the mouse pointer or, in addition, also the path of the mouse movement will be represented via the filter and the mixer and transmitted to the application only after the completion of the action by clicking (for example, in the case of free-hand painting in a corresponding computer application). The application can inform the mini decoder whether it wishes to obtain only the end position or also data on the path covered by the movement of the mouse. This functionality permits faster navigation of a position on a display screen combined with sharply reduced communication with the server.

The type and scope of the add-on devices, which, as well as the mini decoder itself, can be designed as modules, depend on technical conditions such as the type and capacity of the connection to the server, and on the wishes of the user. In this context, a universal interface for the add-on devices permits individual inexpensive solutions which can be adapted to the technical development. In this context, the interface is either looped through the add-on devices or held available in the housing of the mini decoder as a bus for all possible slots, the housing being able to accommodate several such add-on devices.

Figure 2:
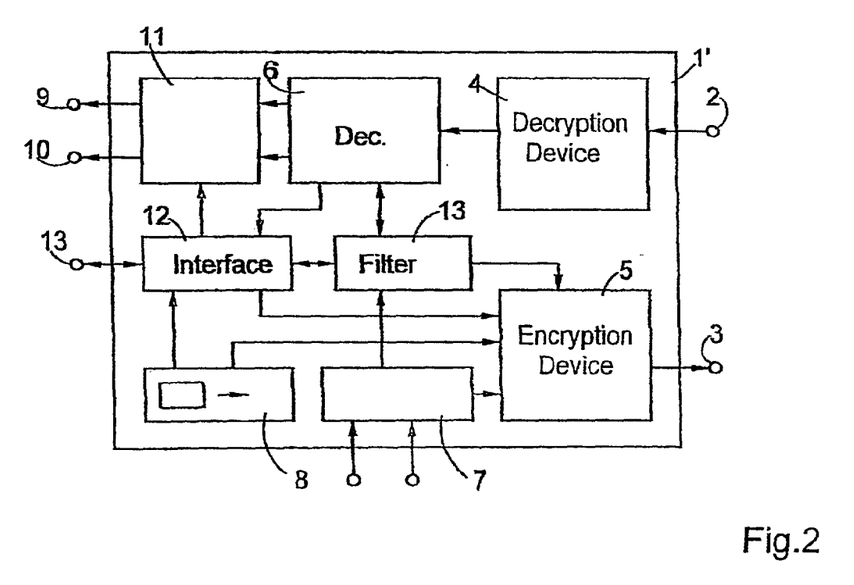
FIG. 2 shows a second embodiment of a terminal device.
Figure 3:
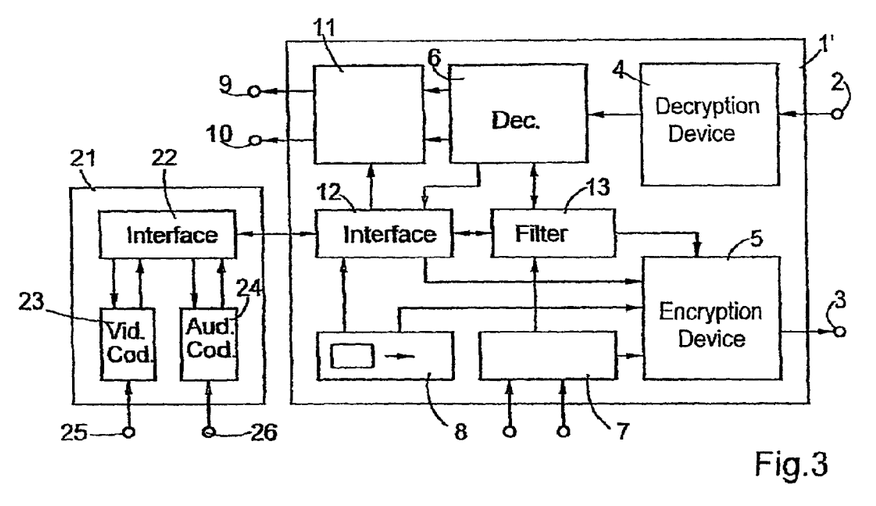
FIG. 3 shows the second embodiment with an add-on device which allows the terminal device to be used as a television telephone.

FIG. 3 shows the mini decoder according to FIG. 2 with an add-on device which permits phone calls to be made with image and sound via the mini decoder and the server. Add-on module 21 contains an interface 22 which corresponds to interface 12 as well as one coder 23, 24 for each of video and audio signals, which can be received from a camera and a microphone (not shown) via ports 25, 26. The coded audio and video signals are transmitted via the mini decoder to the server and from there onward to a remote station. Moreover, the audio and video signals can be routed, via mixer 11, to outputs 9 and 10 and thus locally used as separate image and sound (open listening). Control signals can be processed both by the server and by the user (via filters, for example, for volume up or volume down). Information of the chip card reader can be used as well, for example, to distinguish whether the user has activated the mini decoder locally or if he/she has left the home and wants to use the video camera, for example, for room monitoring.

Figure 4:
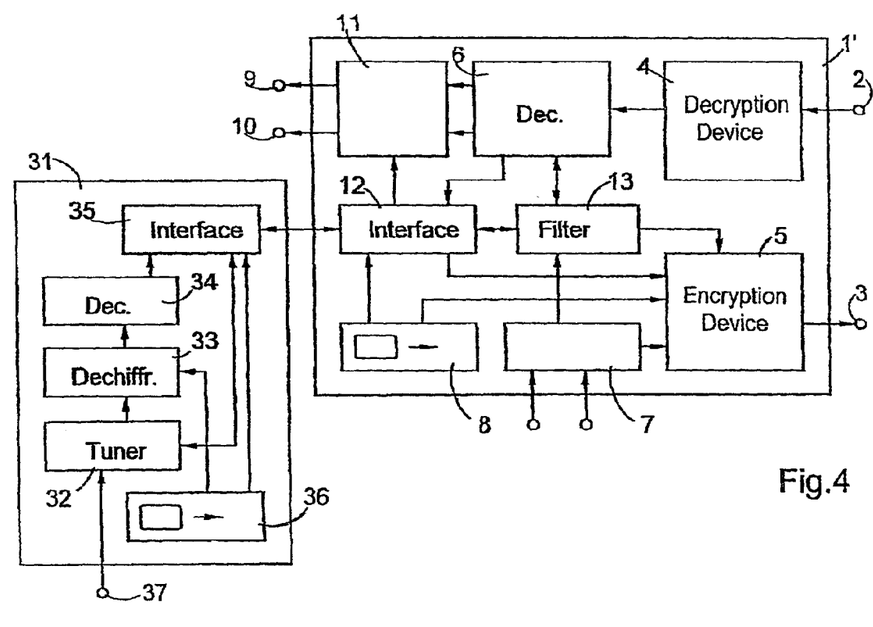
FIG. 4 shows the second embodiment with an add-on device for receiving television broadcasts.

FIG. 4 shows a further add-on module for receiving encrypted digital television signals in connection with the mini decoder, the television signals being received via other paths such as cable, satellite, terrestrial transmitters. For this purpose, add-on module 31 contains a receiver section 32 (tuner) from which the received television signals are fed to a decryption device 33 and from there via a decoder 34 to an interface 35. An input 37 is provided for the connection to a receive antenna or to a broadband cable.

Via interface 12 of mini decoder 1', the mixer and outputs 9 and 10, the received and decoded video signals can be reproduced including the associated audio signals. Add-on module 31 (hereinafter called "TV-module" can be provided with different input modules for adaptation to the signal to be received. For the reception of uncoded analog television signals, the chip card reader and the decryption and decoding devices 33, 34 (pay TV) can be dispensed with.

Using such a TV module and the mini decoder, it is already possible to implement a series of interaction possibilities and additional information. Thus, for example, the possibility exists to mix the signals of the server with the received television signals, which gives program providers much creative leeway. The channel to be received can be selected directly by the user or via the server. A chip card reader 36 in the TV module allows existing access controls to be used with decryption device 33.

Since the server knows the respective selected channel, it is possible to determine the consumer behavior (viewer numbers, changing of channels, etc.). Here, the operator of the server must observe the relevant legal provisions on data security.

Figure 5:
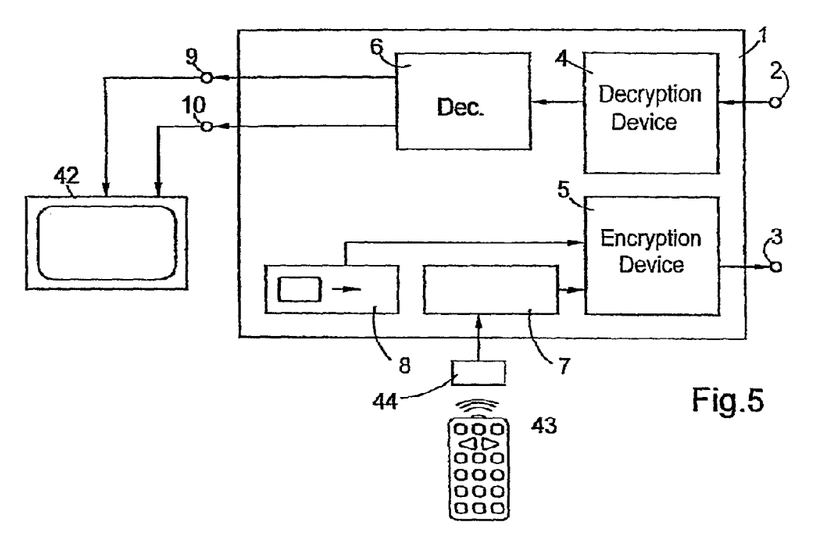
FIG. 5 shows the first embodiment in a configuration as a television set.

FIG. 5 shows an example of the use of mini decoder 1 according to FIG. 1 as a set-top box for a television set 42. In this context, the focus of the applications or services used lies in the area of entertainment. Under the condition of a broadband channel to the server, which is possible, for example, using an XDSL technology via telephone lines, it is possible to supply video and audio signals to a television set which allow display of video in fall screen width as well as video screen contents to be divided into video fields and text regions. In place of usual television set 42, it is also possible to connect a video monitor and a loudspeaker system. The control of mini decoder 1 is accomplished using a suitable remote control 43 for which purpose input unit 7 is provided with a remote control receiver.

Using the configuration depicted in FIG. 5, the following applications can be accomplished:

a) Television programs with or without additional possibilities of interaction by the user. This accompanying information and the program to be controlled by the user as, for example, possibilities to participate in the guessing during a quiz, are provided by the station of the respective program via an application server.

b) Audio and video contents are delivered by an application server upon a corresponding input (video on demand).

c) Storage of audio and video contents on an application server (storage server) upon customer request.

d) Repetition of a specific time interval of the current program (instant replay), for example, replay of a goal during a soccer broadcast upon customer request; the storage of the content that can be replayed is performed either on a respective application server, on the mini decoder server, or on a storage device of the mini decoder (limited time, circular buffer).

e) Internet access; in this case, the contents are made available in the form in which they are provided by the operator of the respective web page.
f) Email.
g) Provision of computer programs (applications) such as games, learn programs, text processing; in this connection, any program having a graphical user interface or alphanumeric output can be offered to the user. It runs on an application server of the respective provider.

Figure 6:
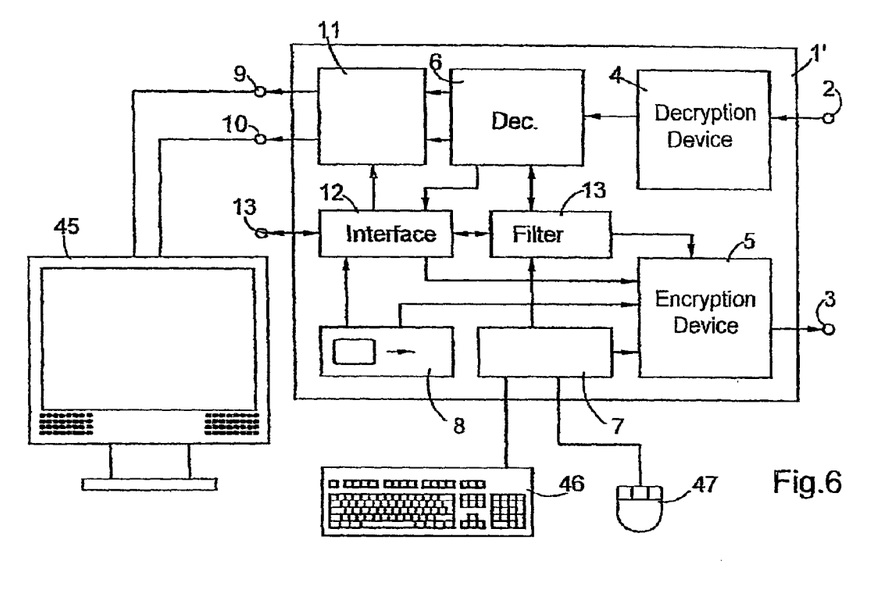
FIG. 6 shows the first embodiment in a configuration as a workstation system.

In the configuration shown in FIG. 5, the entry of commands is limited to the remote control. If the intention is for the mini decoder to be used in a workstation system with standard office applications such a word processing, spreadsheet analysis and the like, a configuration according to FIG. 6 is suitable. In this case, the image information is represented on a computer screen 45 which also contains the loudspeakers required for possible audio information. As usual with PCs, a keyboard 46 and a mouse 47 are provided as input devices. For example, an IP-based LAN can be used as a network connection. In this exemplary embodiment, provision is made for a mini decoder 1' which is equipped with an interface 12 to allow connection of further local devices such as printers or scanners, possibly, via a suitable add-on module.

Figure 7:
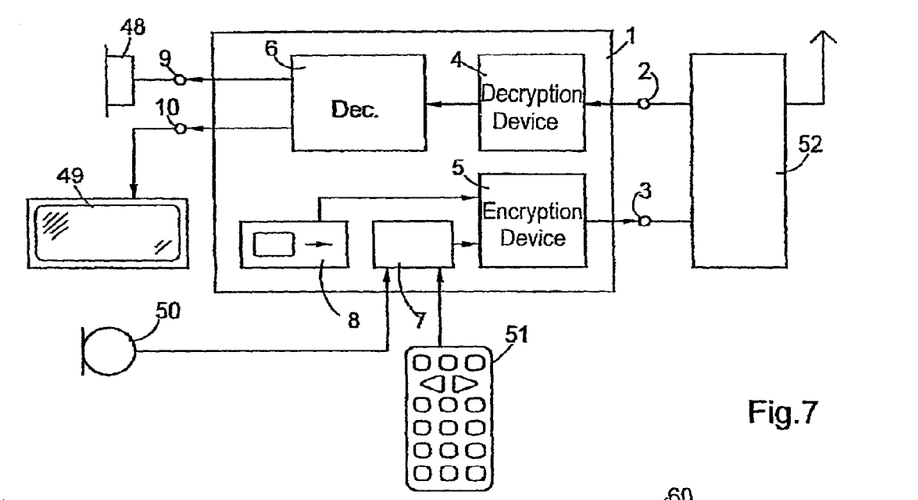
FIG. 7 shows the first embodiment integrated in a mobile telephone.

The mini decoder can be made so a compact that it can to be integrated in a mobile telephone, which is schematically shown in FIG. 7. Given an appropriate arrangement between the operators of the mobile telephony network and of the mini decoder server, it is possible for chip card reader 8 of mini decoder 1 to be also used for authentication and encryption in the mobile telephony network. In this connection, the control of the mobile telephone can be accomplished via a keypad or by voice input.

In the mobile telephone device, mini decoder 1 is connected to a speaker 48, a display 49, a microphone 50, the operating element 51, and to a transmitter/receiver device 52. Using a mobile telephone device which is extended according to FIG. 7, it is possible to achieve a considerably extended use, in particular, the provision of information existing in written or graphical form as, for example, email, appointments, short notes, contact addresses, queries of current states, in particular of the traffic situation and stock market prices. Through the access to the mini-decoder server, such services and applications can be implemented without corresponding hardware or software in the mobile telephone.

Figure 8:
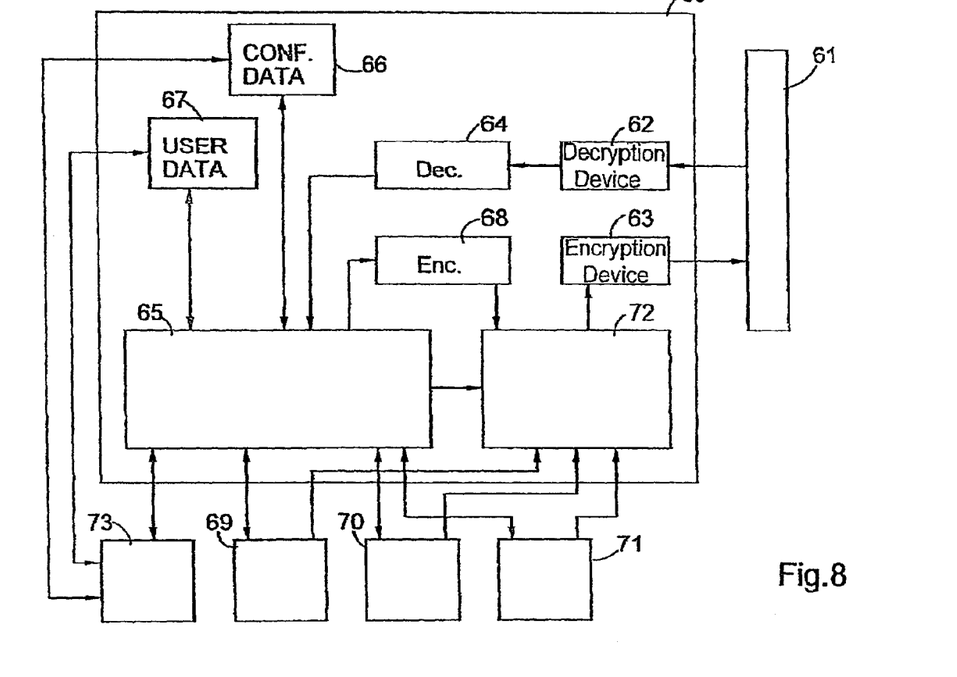
FIG. 8 shows an embodiment of a server which is connected to the telecommunications network.

FIG. 8 schematically shows an embodiment of a server 60 which is able to be reached by mini decoders via a telecommunications network 61. This server will hereinafter be referred to as mini-decoder server.

In a similar manner as the mini decoders, mini-decoder server 60 is connected to telecommunications network 61 via a decryption device 62 and an encryption device 63. Connected downstream of decryption device 62 is a decoder 64 which decodes the signals transmitted by the mini decoders.

Each user logon to a mini decoder (for example, by inserting a chip card) activates an application 65 in the server, the application controlling the state of the use of the system (hereinafter called "session") following the logon. This application (hereinafter called "session control") is active until the user terminates the session. Other possible causes for the termination of a session can be, inter alia, the failure of the user to respond to a repeated request by the system to enter an acknowledgment, or the interruption of the line between the mini decoder and the mini-decoder server.

At the start of a session, the session control checks the access right of the user. It compares the data which is sent by the user via the mini decoder to entries in a user data base (USER DATA, 67) in which user data (PIN, passwords) and access rights for different services and contents are stored. Furthermore, the user data base can support the personal configuration of services (which can be set via corresponding menus of the basic navigator) by keeping available corresponding data.

Via a dialog with the mini decoder, the configuration of the mini decoder and the properties of the network connection are also queried at the beginning of the session.

This dialog between the mini decoder and the server is invisible to the user, at least for as long as the configuration of the mini decoder remains unchanged. In the case of a changed device configuration, which is detected by comparison to the configuration data base (CONF. DATA, 66), a dialog with the user may be required to set the new possibilities (for example, upon insertion of a new add-on card at the interface). The like is true of a change of the network connection of the mini decoder.

Also at the beginning of a session, a connection is established to an accounting application 73. This application communicates with the user data base, the configuration data base, and the session control. It makes available the data for a later billing. In the case of a negative credit rating check at the beginning of the session and, possibly, if a credit is used up during a session, this application can also cause the session to be terminated.

After the session has successfully logged on, the (possibly personal) basic navigator is started as an element of the session control. The customer can now activate a service.

The then selected services or the computer applications associated therewith (69, 70, 71 are noted in FIG. 8 as examples thereof) can be executed on the mini-decoder server, or the server establishes a connection to one or more other computers (application servers) for this. The already coded data of applications 69, 70, 71 is made available in mixer 72 of the mini-decoder server for a possible encryption in encryption unit 63.

In this context, encoding device 68 can also be used by applications 69, 70, 71 by routing the data through session control 65.

As will be explained later with reference to FIG. 9, it is perfectly possible to feed information items of several applications to a mini decoder, the information items being superimposed there in a suitable manner. To this end, these information items are assigned representation planes and, possibly, transparency features by session control 65. In this context, session control 65 routes user commands to the correct application 69, 70 or 71.

In order to provide the mini decoder user with different image information items at the same time, it is possible to process all image and sound contents into a resulting signal in a complex mixing element 72 of the mini-decoder server which, however, may require too much effort for many users.

Therefore, it can be expedient to carry out the mixing in the mini decoder using mixers 11 and decoder elements 6 (FIGS. 1 through 7) of suitable capacity. Then, the mixer not only adds internal image information (received from add-on modules via interface 12) to the images which are received from the server but also assembles the image information of the applications which are controlled via the mini-decoder server. To this end, these different images are each provided with information on the plane of representation (whether they appear in the foreground or in the background). In the case that the applications only fill partial areas of the entire image that the rest is defined as transparent, complex image compositions can be formed as is explained with an example in FIG. 9.

In this example, (FIG. 9), information items from four different sources are fed to one mini decoder virtually simultaneously. (Strictly speaking, the data transmission takes place, in a time-staggered manner in this process, and the images are prepared in volatile intermediate storage devices and held available until they are jointly represented synchronously. In the example, the content of image 81 is displayed in the frontmost plane, the content of image 82 in the next following plane, the content of image 83 in the third plane, and the content of image 84 in the fourth plane. The number of planes which can be decoded and administered by the mini decoder depends on its design and is recorded by the server in the configuration data base.

In this context, the image scenario shown in FIG. 9 could be created by the applications listed in the following table. The coding specified in the table is also only an example for the use of different coding standards.

| Image | Content | Data | Coding | Sound |
|---|---|---|---|---|
| 81 | email message | Image | JPEG | short sequence |
| 82 | image of the interlocutor in video telephony | video | H323 | yes |
| 83 | additional information regarding the television program | Image | JPEG | — |
| 84 | television program | video | MPEG | yes |

Figure 9:
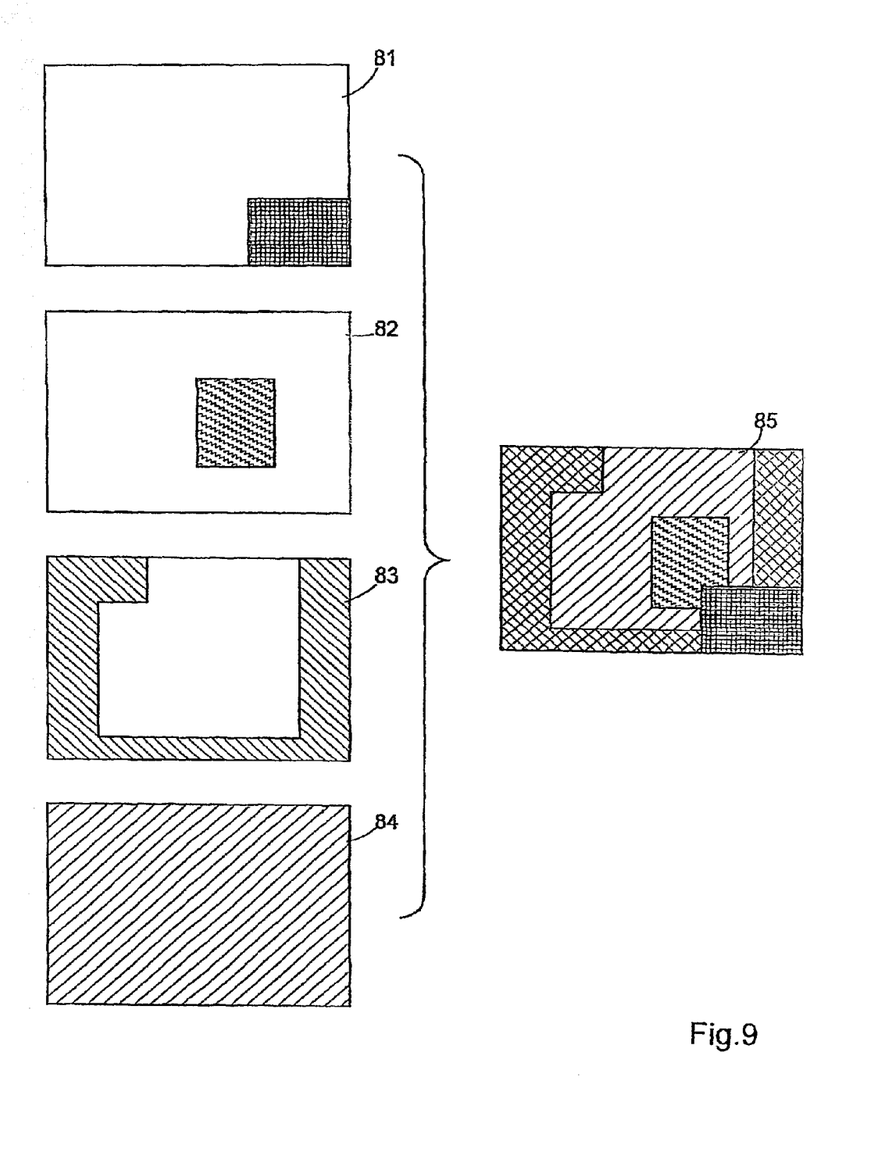
FIG. 9 depicts the assembly of an image from several pieces of image information which are fed to a mini decoder.

Furthermore, FIG. 9 shows assembled image 85, the hatching of the individual images and of the entire image being selected such that the hatching is less dense as the viewing plane is moved deeper. Moreover, the transparency of image 83 is marked in image 85 by including the hatching of the television image. The user can display or hide the individual images via corresponding operator input, for example, the user can hide the notification of an email after perceiving it. Similarly, image 82 of a video telephone connection is removed after the connection has been released.

In this context, the mini decoder can mix the sound signals accordingly, which can be set by the user, supported by the basic navigator.

Figure 10:
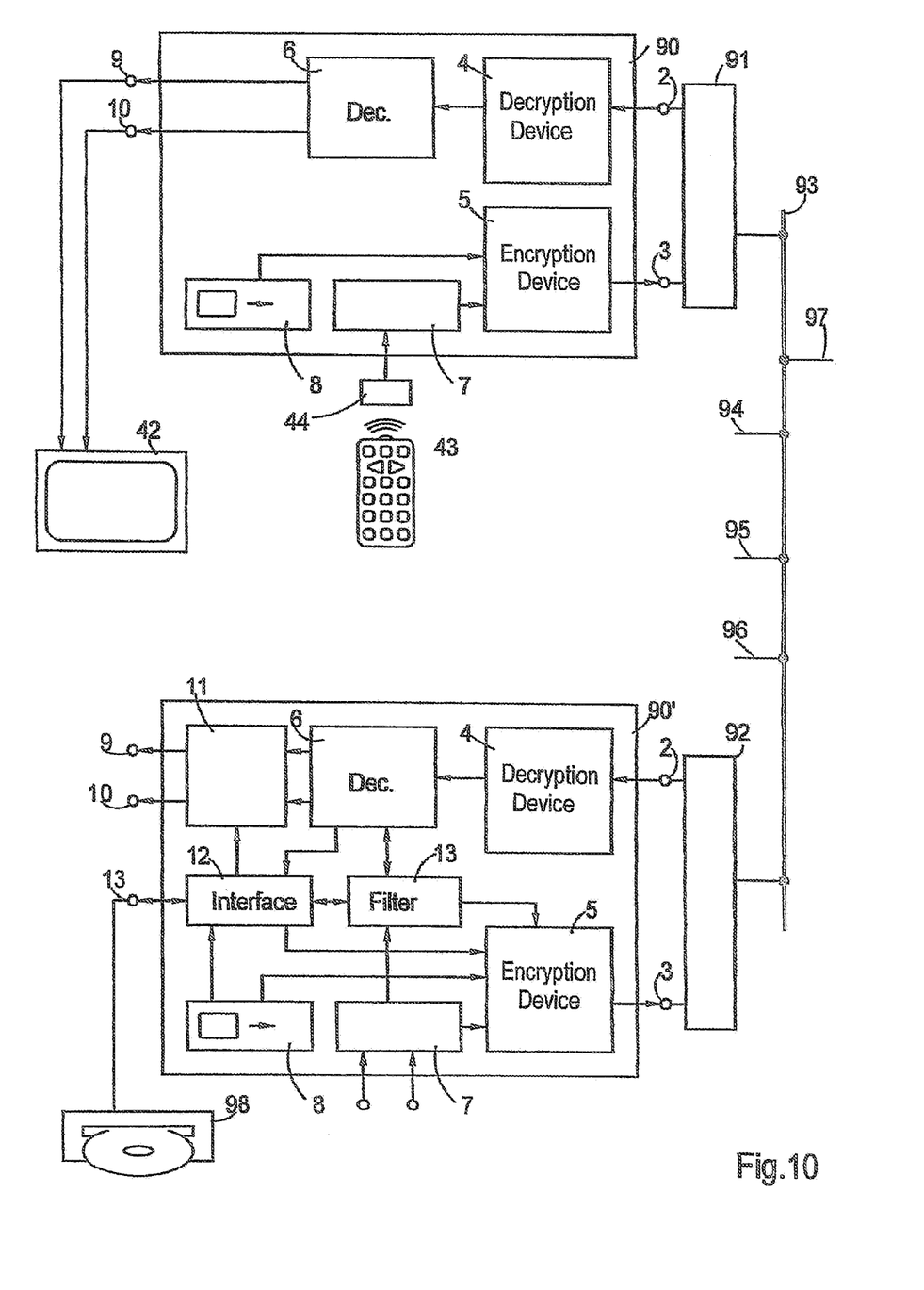
FIG. 10 shows the mini decoder on a home network.

FIG. 10 shows several mini decoders interconnected via a home network, resulting in further advantages. For this purpose, mini decoders 90, 90' are each provided with an interface 91, 92 which are connected to a bus system 93. Further mini decoders can be connected at 94, 95, 96 while connection to a communications network is possible at 97. The home network is connected to the communications network and to the mini-decoder server via interface 97. If home network 93 is equipped with a controllable distribution functionality, for example, using a programmable switch or distributor, then this distribution functionality can be controlled directly by the mini decoder or via the mini-decoder server in such a manner that data of a mini decoder (transmitter) are made available to a second mini decoder (receiver) within the home network, the data flow of the transmitter being controllable by the receiver. If the home network has no distribution functionality, then the communication between the transmitting and the receiving mini decoders can be handled via the mini-decoder server. In this context, the properties of the home network can be maintained by the mini-decoder server in configuration data base 66.

In FIG. 10, mini decoders 90, 90' are designed similarly to those depicted in FIGS. 1 and 2. Mini decoder 90' is connected to a DVD player 98 as the add-on module. Therefore, a user of mini decoder 90 with attached television set 42 can watch a movie on a DVD if, in a different place in the house, this DVD is inserted into the DVD player located there. Thus, many types of use are possible via the home network even if not all connected mini decoders are fully equipped with add-on modules.

The owner of a mini decoder can make an agreement with the operator of the mini-decoder server that he/she may control specific devices connected to the home network remotely from outside. These devices can be, for example, mini decoders having a camera module according to FIG. 3 which can be used for room monitoring, for example, for supervising children. Further units connected to the home network as, for example, a heating system or an alarm system which performs room monitoring via a corresponding mini-decoder module, could by themselves send messages to the mini-decoder server or be remotely controlled from outside via the mini-decoder server.

In some embodiments, mini decoders 90 and/or 90' may have no encryption or decryption devices and no chip card reader. This can be advantageous not only for mini decoders which are connected to home networks but is also possible in public telecommunications networks in the case of low security requirements against misuse or when working with telecommunications networks which already ensure a sufficiently high degree of security.

In the preceding specification, the invention has been described with reference to specific exemplary embodiments thereof It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A terminal device for using different services offered via a telecommunications network, comprising:
   at least one receiving device configured for receiving image and sound information from the telecommunications network;
   at least one transmitting device configured for transmitting data to the telecommunications network, the data used to select the received image and sound information from the telecommunications network;
   an input unit connected to the transmitting device and configured to interface with an input device, the input device configured to interact with the terminal device, including the transmitting device;
   a decoder configured for decoding the image and sound information, the decoder connected downstream of a decryption device so as to enable program and control information, transmitted together with the image and sound information, to be evaluated; and
   at least one output configured for outputting at least one of the image and sound information,
   wherein priorities in assembling of the image and sound information are controlled using data received with the image and sound information, wherein the priorities and a representation of the image and sound information are dependent on operator input via the terminal device so as to display or hide individual images of a joint synchronous representation of two or more images from the outputted image information, wherein transparency features in the image information permits complex foreground/background superimposition of the individual images of the joint synchronous representation.

2. The terminal device as recited in claim 1 further comprising a reading device configured for reading mobile data carriers.

3. The terminal device as recited in claim 2 wherein the reading device enables an entering of security codes.

4. The terminal device as recited in claim 1 further comprising a recognition device configured for recognizing a security feature.

5. The terminal device as recited in claim 4 wherein the security feature includes at least one of a fingerprint and an iris image.

6. The terminal device as recited in claim 1 wherein the receiving device includes a decryption device and the transmitting device includes an encryption device.

7. The terminal device as recited in claim 1 further comprising:
a mixer located in a path of decoded image and sound information;
a reading device configured for reading at least one mobile data carrier; and
an interface configured for connection of at least one add-on device, the interface being capable of receiving data from the decoder and the reading device and sending data to the transmitting device and to the mixer.

8. The terminal device as recited in claim 7 further comprising a filter device controllable by the decoder and the input unit and connected to the interface, to the decoder and to the transmitting device.

9. The terminal device as recited in claim 1 further comprising a circular memory configured for repeating video and/or audio sequences.

10. The terminal device as recited in claim 1 wherein the input unit includes at least one port configured for at least one input device.

11. The terminal device as recited in claim 10 wherein the at least one input device includes at least one of a keyboard, a pointer device and a microphone configured for voice control.

12. The terminal device as recited in claim 1 wherein the input unit includes at least one of an infrared receiver and a radio receiver.

13. The terminal device as recited in claim 7 wherein the at least one add-on device includes a coder and respective inputs for video and audio signals.

14. The terminal device as recited in claim 7 wherein the at least one add-on device includes a receiver section configured for receiving television broadcasting, a decryption device and a decoder.

15. The terminal device as recited in claim 14 wherein the at least one add-on device includes a second reading device configured for reading data carriers.

16. The terminal device as recited in claim 15 wherein the reading device includes a chip card reader.

17. The terminal device as recited in claim 1 wherein the receiving device is capable of receiving data including algorithms for decoding the image and sound information, the data being storable on the terminal device in volatile memory and useable in the decoder to decode subsequently received image and sound information.

18. The terminal device as recited in claim 1 wherein the terminal device is integrated in a mobile telephone, the video signals are feedable to a display of the mobile telephone, and the input unit is connected to a second input unit of the mobile telephone.

19. The terminal device as recited in claim 1 wherein the terminal device is integrated in a television receiver.

20. The terminal device as recited in claim 1 wherein the terminal device is integrated into a video monitor.

21. The terminal device as recited in claim 1 further comprising an image and/or sound mixer configured for assembling received sound and/or image information of several images and/or sound events.

22. A server for at least one terminal device, each terminal device including at least one receiving device configured for receiving image and sound information from a telecommunications network; at least one transmitting device configured for transmitting data to the telecommunications network, the data used to select the received image and sound information from the telecommunications network; an input unit connected to the transmitting device and configured to interface with an input device, the input device configured to interact with the terminal device, including the transmitting device; a decoder configured for decoding the image and sound information, the decoder connected downstream of a decryption device so as to enable program and control information transmitted together with the image and sound information, to be evaluated; and at least one output configured for outputting at least one of the image and sound information; the server comprising:
at least one connection device configured for connecting the server to a telecommunications network;
at least one authorization device configured for performing authorization checks using data received from the at least one terminal device; and
at least one receiving and processing device configured for receiving and processing service requests of the at least one terminal device,
wherein priorities in assembling of the image and sound information are controlled using data received with the image and sound information, wherein the priorities and a representation of the image and sound information are dependent on operator input via the terminal device so as to display or hide individual images of a joint synchronous representation of two or more images from the outputted image information, wherein transparency features in the image information permits complex foreground/background superimposition of the individual images of the joint synchronous representation.

23. The server as recited in claim 22 further comprising:
at least one first routing device configured for routing service requests to at least one application server; and
at least one second routing device configured for routing data of at least one application server to the at least one terminal device.

24. The server as recited in claim 22 wherein the server is configured for permitting remote control of add-on modules on the at least one terminal device.

25. The server as recited in claim 22 wherein remote control is permitted for at least one of power on/off and a data exchange functions.

* * * * *